June 23, 1959  G. H. HOWE  2,891,883
MAGNETIC NICKEL BASE MATERIAL AND METHOD OF MAKING
Filed June 14, 1955  5 Sheets-Sheet 1

Inventor:
Goodwin H. Howe,
by Paul G. Frank
His Attorney.

June 23, 1959 G. H. HOWE 2,891,883
MAGNETIC NICKEL BASE MATERIAL AND METHOD OF MAKING
Filed June 14, 1955 5 Sheets-Sheet 2

Inventor:
Goodwin H. Howe
by Paul A. Frank
His Attorney.

June 23, 1959 G. H. HOWE 2,891,883
MAGNETIC NICKEL BASE MATERIAL AND METHOD OF MAKING
Filed June 14, 1955 5 Sheets-Sheet 3

Inventor:
Goodwin H. Howe,
by Paul A. Frank
His Attorney.

Inventor:
Goodwin H. Howe,
by Paul A. Frank
His Attorney.

Inventor:
Goodwin H. Howe,
by Paul A. Frank
His Attorney.

12
United States Patent Office
2,891,883
Patented June 23, 1959

2,891,883

MAGNETIC NICKEL BASE MATERIAL AND METHOD OF MAKING

Goodwin H. Howe, Scotia, N.Y., assignor to General Electric Company, a corporation of New York Application June 14, 1955, Serial No. 515,469

8 Claims. (Cl. 148—2)

This invention relates to soft magnetic materials and, more particularly, to a soft magnetic alloy composed essentially of iron, nickel and molybdenum particularly processed to produce sheet or strip-like material having exceptionally useful dynamic magnetic properties characterized by high permeability, low coercive force and high remanence or residual inductance and the method of making such material.

Magnetically "soft" materials, as distinguished from "hard" or permanent magnet materials, have a wide variety of uses in electrical and electronic applications. "Soft" magnetic materials may be said to be materials which acquire a large fraction of their total potential magnetization when exposed to a weak magnetic field, for example, a field of less than one oersted. In particular, such materials have found wide utility and constitute an essential component of a class of apparatus known as "saturable-core reactors." In general saturable-core reactors are used for electrical control purposes, and more specifically to control the flow of alternating current with a much higher efficiency than that provided by rheostatic type control. In general, apparatus of this type comprises alternating current-carrying coils wound upon a core of soft magnetic material. Control over the alternating current flowing through these coils is accomplished by controlling the degree of unidirectional saturation of the magnetic core material by varying a controlling direct current through a separate coil wound about a portion of the same core, or by accomplishing the same purpose by means of a strong permanent magnet which influences the saturation of the core, or by influencing the saturation of the magnetic core by means of a controlling alternating current, and also by various combinations of the controlling apparatus previously recited.

Generally speaking, the magnetic characteristics of the core materials employed in saturable-core apparatus determines the field of application in which the apparatus is useful. For example, in the field of heavy duty power control apparatus the silicon steels have proved quite useful. On the other hand, nickel-iron alloys are most useful in small low power saturable reactors where a maximum of inductance variation is desired for a given direct current control power such as, for example, in magnetic amplifiers. While the magnetic material of my invention is useful in apparatus classifiable in both of the preceding groups, it possesses magnetic properties and characteristics which render it eminently suitable for use in the latter of the preceding classes, particularly in such apparatus for use with alternating current supplies having frequencies as high as several hundred cycles. In the following disclosure, in order to more completely disclose and particularly point out my invention and its advantages over previously known materials, examples of its performance in magnetic amplifier circuits will be compared to previously known materials.

Previously known iron-nickel base core materials have relatively high permeability and low hysteresis losses and in general have proven adequate for use as a saturable core material in apparatus such as magnetic amplifiers which operate in the frequency ranges, for example, 60 to 1000 cycles. However, these previously known materials have had magnetic properties which have usually been compromises in that in order to attain higher values for one of the magnetic properties, all or some of the other magnetic properties have had less desirable values or characteristics. For most applications in which these materials are used, high permeability, high saturation density, high remanence, low coercivity, and low permeability in the saturation region as determined by dynamic tests are most desirable characteristics. These magnetic characteristics combine to form a substantially rectangular hysteresis loop when the ratio of remanence to saturation density $(B_r:B_s)$ exceeds about 0.8. For example, when cores of soft magnetic materials are employed in magnetic amplifiers, materials having the narrowest dynamic hysteresis loops provide higher power output and gain. Previously known materials which have been useful in saturable-core reactor apparatus such as magnetic amplifiers have had adequate characteristics for lower frequency operation such as, for example, 60 to 1000 cycles. However, at higher frequencies, for example, 400 cycles, their dynamic hysteresis loops have broadened significantly, thereby reducing the power gain of the circuit to a value less than that which would be realized if the hysteresis loop had not widened with increased frequency. My invention is concerned with a soft magnetic material suitable for use as a core material in saturable-core reactors operating at both lower and higher frequencies and having outstanding dynamic magnetic properties. An important feature of my invention is the preferred processing schedule for producing optimum magnetic properties in the material of my invention.

A principal object of my invention is the provision of polycrystalline face-centered cubic soft magnetic sheet or strip metal having higher permeability and remanence and lower coercivity than heretofore known. A further object of my invention is the provision of a method for making such material. A yet further object of my invention is the provision of a grain oriented cast intermediate or blank from which such magnetic material may be manufactured.

Briefly stated, in accordance with one aspect of my invention I provide an improved grain and domain oriented soft magnetic material comprising a sheet or strip of a face-centered cubic metal consisting essentially of iron, nickel and molybdenum by rolling, heat treating and magnetically annealing a grain oriented casting, the resulting polycrystalline sheet material having a high percentage of its grains oriented (102) [010], according to the Miller Index System nomenclature, with respect to the direction of rolling. As a result of this treatment, this sheet or strip material has outstanding magnetic properties which render it particularly useful in saturable core reactor applications.

My invention will be better understood from the following description taken in connection with the accompanying drawings and its scope will be pointed out in the appended claims.

In the detailed description of my invention which follows, comparisons will be made between the core material of my invention and previously known core materials. For purposes of comparison the following three widely known core materials have been selected for discussion, namely alloys widely known as "65 Permalloy," which is an alloy essentially composed of 65 percent nickel, balance iron, having a resistivity of about 25 micro-ohm centimeters, "Deltamax," which is composed essentially of 50 percent nickel and 50 percent iron and having a resistivity of about 45 micro-ohm centimeters, and "Supermalloy" composed essentially of 79 percent nickel, 5 percent molybdenum, balance iron, and having a resistivity of 60 micro-ohm centimeters.

The core material of my invention is prepared from a cast metal composed essentially of from 55–70 percent nickel, 1–3 percent molybdenum, over 0.01 percent oxygen, balance substantially all iron, and preferably, from 58–68 percent nickel, 1.75–2.25 percent molybdenum, 0.2–0.4 percent manganese, over 0.01 percent oxygen, balance substantially all iron.

The resistivity of the material of my invention varies according to the molybdenum content. For example, materials containing about 65 percent nickel, 1, 2.16 and 2.9 percent molybdenum, balance substantially all iron have measured resistivities of 34, 47.7 and 54.1 micro-ohm centimeters, respectively. In general, when core materials of this type are used in saturable-core reactors, the higher values of resistivity are desirable in order to reduce eddy current losses.

It has been found that certain of the magnetic properties of previously known iron-nickel base alloy materials may be improved by employing a magnetic anneal in the later stages of their processing. The magnetic anneal used in treating the material of my invention and referred to hereinafter consists of heating the material in a hydrogen atmosphere to a temperature of about 650° C. and cooling at a rate of 150° C. per hour while subjecting the material to the influence of a magnetic field of about ten to twelve oersteds. The field, cooling rate and hydrogen atmosphere should be maintained until the temperature has fallen to about 300° C. The field may be either direct current or alternating current. Good results have been obtained with alternating current magnetic fields as high as 400 cycles, although such frequencies are neither necessary or particularly advantageous. For example, a similar magnetic annealing treatment applied to "65 Permalloy" rolled strip or sheet has resulted in material reported to have a maximum permeability of the order of 400,000.

As is commonly known the various elements crystallize according to a definite pattern or symmetrical arrangement of atoms that is repeated at regular intervals to form a crystalline body. The three dimensional lattice work of imaginary lines connecting the atoms is called a space lattice. The smallest prism which possesses the full symmetry of the crystal is termed the unit cell. The materials comprising my invention have an atomic arrangement or space lattice classified as cubic and more particularly as "face-centered cubic," i.e., the material is essentially composed of iron and nickel atoms arranged in unit cells, each cell comprising 14 atoms, eight of which are arranged at the eight corners of an imaginary cube with the remaining six atoms occupying a position at the geometrical center of each of the six imaginary cubic faces.

It is known that the direction of easiest magnetization of this face-centered cubic material is along and in the direction of the imaginary cube edges. It is also known that when a molten material of this type is cast into a mold, a few columnar crystals are sometimes formed during solidification which extend from the mold wall toward the central portion of the ingot with the axis of the column substantially perpendicular to the mold wall. The cubic space lattices of the atoms comprising the columnar crystals are arranged with their imaginary cube edges parallel to the longitudinal axis of the columnar crystal. I discovered that an oriented casting having a composition within the range previously recited consisting primarily or almost exclusively of properly oriented columnar grains or crystals, when subjected to proper reduction techniques produces a usable soft magnetic sheet or strip which retains sufficient grain orientation from the oriented casting and has significantly improved magnetic properties which may then be further improved by a magnetic anneal.

Figure 1:
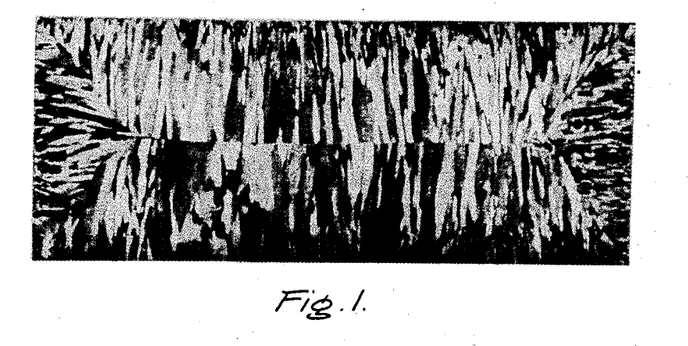
Figs. 1 and 2 are cross-sections of cast ingots.
Figure 2:
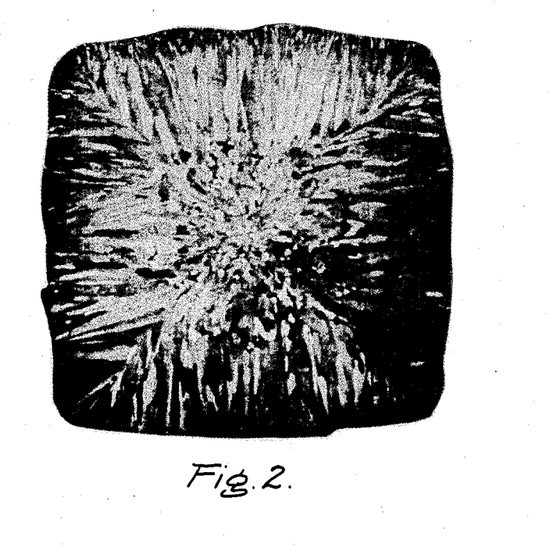

Accordingly, a number of heats or batches of the material of my invention were prepared and castings made. I discovered that the degree of orientation of such castings was quite critical and exerted a profound influence upon the magnetic characteristics of sheet or strip produced from such a casting, particularly permeability. In Fig. 1 of the drawing, a cross-section of a slab casting is shown which illustrates a very high degree of, if not perfect, columnar orientation. Upon inspection it will be noted that the vast majority of the grains or crystals of the material are in an elongated or columnar form having their axes substantially parallel and perpendicular to the lateral surfaces of the casting as defined by the sides of the rectangular cross-section of Fig. 1. As will be pointed out in more detail later, strip or sheet material made by rolling castings having a similarly high degree of orientation possesses significantly superior magnetic properties to strip or sheet material identically processed from castings having a lower degree of orientation. An example of such a casting having a lower degree of orientation is shown in Fig. 2. Upon inspection of Fig. 2 it will be noted that there is a substantial proportion of the grains shown in the transverse cross-section of the casting which are not columnar in configuration but are "equi-axed," i.e. fairly symmetrical in cross-section. Sheet and strip material processed from castings having a substantial amount of equi-axed grains invariably had poorer magnetic properties than sheet or strip material processed from castings having a degree of columnar orientation comparable to the example shown in Fig. 1.

In the production of castings as illustrated in Fig. 1, I have found that the highest degree of orientation may be obtained by casting the material in graphite molds. I have further found that a rectangular configuration of the mold cross-section is preferred to a square or substantially square cross-section and that more consistent high magnetic properties are obtainable when such rectangular cross-section slabs are reduced solely by rolling since it appears from the available evidence that hot forging of square cast ingots to flat billets for further reduction adversely disturbs the crystal orientation. While the cross-sectional configuration of the ingot shown in Fig. 1 is truly rectangular in that it is composed of an area bounded by a first pair of spaced substantially parallel sides and a second pair of shorter spaced substantially parallel sides perpendicular to the first pair, I wish it to be understood that the sides connecting the first, longer, parallel sides need not be straight, nor parallel. In fact, quite successful oriented cast ingots have been made according to my invention in which these second sides have been segments of circles, for example. It will therefore be appreciated that the exact cross-sectional shape of these ingots need only be generally rectangular in shape and that I use the term quite broadly. I have further found that conventional cast iron molds or molds of other metallic materials appear to be inferior to molds made of graphite in that a high degree of orientation has not been obtained in castings from molds made of other materials.

More specifically, and by way of example, the cast slab illustrated in Fig. 1 was prepared as follows. An alloy having the composition 64.45 percent nickel, 2.01 percent molybdenum, 0.22 percent manganese, 0.06 percent silicon, 0.01 percent aluminum, balance iron, was melted in air in an induction furnace. The melt was approximately 120 pounds in weight. The melt was cast into 1½ by 4 by 12 inch slabs in split graphite molds, the ingots being cast with their longest dimension vertical. Fig. 1 is a cross-section of one of these ingots after being polished and etched, the specimen being taken at approximately the center of the ingot transverse to its longest dimension. The slabs were ground to remove surface defects and heated in a hydrogen atmosphere at from 1000° C. to 1150° C. and hot rolled from approximately 1⅜ inch thickness to ½ inch thickness, reheated to 900° C. to 1000° C. and hot rolled from ½ inch to ¼ inch thickness. During these hot rolling programs and in the following cold rolling treatment, the rolling plane was maintained approximately parallel to the original four inch wide slab faces and the rolling direction was maintained parallel to the original longest dimension of the ingots. In this manner, the material forming those columnar grains which had grown toward the central portion of the ingots from the longest slab faces was worked during rolling such that the longitudinal axes of the original columnar grains was maintained approximately perpendicular to both the rolling plane and the rolling direction.

The material was then heated for one hour at from 900° C. to 1000° C. in a hydrogen atmosphere and rapidly cooled in a hydrogen atmosphere. The material was further reduced in the same plane and direction about 60 percent by cold rolling to about 0.100 inch thickness. The rolled material was subjected to a four and one-half to five hour 700° C. hydrogen atmosphere anneal and permitted to rapidly cool in a hydrogen atmosphere. The material was then further reduced by cold rolling to 0.002 inch thickness, a 98 percent reduction.

Representative samples of the material in the form of 0.002 by ½ inch wide tape were recrystallized by annealing for from ten to thirty minutes in hydrogen at temperatures from 500° C. to 900° C. This annealed material was wound into test cores and annealed for from two to four hours at from 1050° C. to 1250° C. in pure dry hydrogen and one hour at 650° C. in a hydrogen atmosphere in a magnetic field of about ten oersteds. The direct current magnetic properties of some of these specimens which were annealed for four hours at 1100° C. followed by the magnetic anneal were then measured and are recorded in the following Table I.

*Table I*

| Specimen | Recrystallized | $\mu_{Max}$ | at B | Peak B ($B_s$) | $B_r$ | $H_c$ |
|---|---|---|---|---|---|---|
| A | 10 min. 500° C. | 800,000 | 9,200 | 12,440 | 11,490 | 0.0125 |
| B | 10 min. 700° C. | 1,073,000 | 10,400 | 12,490 | 11,910 | .0096 |
| C | 10 min. 900° C. | 1,036,000 | 10,200 | 12,590 | 11,980 | .0095 |
| D | None | 621,000 | 8,800 | 12,740 | 11,780 | .0150 |

The same specimens were then re-annealed for four hours at 1200° C. in pure dry hydrogen followed by another magnetic anneal as previously described. The magnetic properties of the specimen cores were again measured, the results of which are reproduced in Table II.

*Table II*

| Specimen | $\mu_{Max}$ | at B | Peak B ($B_s$) | $B_r$ | $H_c$ |
|---|---|---|---|---|---|
| A | 1,231,000 | 9,300 | 12,500 | 11,600 | 0.0077 |
| B | 1,615,000 | 10,100 | 12,640 | 12,020 | .0055 |
| C | 1,530,000 | 9,900 | 12,640 | 11,940 | .0055 |
| D | 723,000 | 9,500 | 12,630 | 11,880 | .0109 |

Two of the specimen cores were then given an additional anneal of four hours at 1300° C. in pure dry hydrogen and again followed by another magnetic anneal as described above. The magnetic properties of these specimens were measured and are reproduced in Table III.

*Table III*

| Specimen | $\mu_{Max}$ | at B | Peak B ($B_s$) | $B_r$ | $H_c$ |
|---|---|---|---|---|---|
| A | 449,000 | 8,900 | 11,090 | 10,280 | 0.0176 |
| B | 551,000 | 9,500 | 11,190 | 10,600 | .0124 |

From the foregoing it is observed that the highest permeabilities were measured on tape which had been subjected to recrystallization at 700° C. prior to four hour high temperature and magnetic anneals. When these specimens were reannealed for four hours at 1200° C. followed by a magnetic anneal, a substantial increase in the permeabilities of the prior recrystallized specimens resulted, particularly specimen B. The behavior of these specimens and particularly the poor properties obtained after re-annealing the specimens at 1300° C. are perhaps best explained by a difference in the texture observed from conventional X-ray diffraction examinations.

Figure 3:
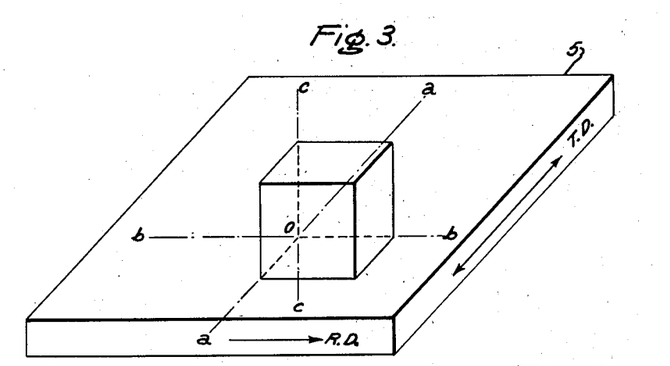
Figs. 3 and 4 are schematic representations of the grain orientation of the face-centered cubic material comprising my invention at different stages of treatment.

The orientation or texture of the face-centered cubic crystal lattice structure of specimen C was investigated by conventional X-ray diffraction techniques after each of the foregoing annealing treatments. More specifically, after the cold rolled 0.002 inch thick strip had been recrystallized by heat treatment for ten minutes at 900° C., it was found that a majority of the face-centered cubes constituting the material were aligned so that the cube faces were parallel to the surface of the metal strip and to the rolling direction. This orientation is schematically illustrated in Fig. 3 in which the rectangular member 5 represents a portion of the metal strip. The arrow bearing the legend R.D. indicates the rolling direction and the arrow bearing the legend T.D. indicates the transverse to rolling direction. The directions indicated by these two arrows are perpendicular to each other. As shown the three mutually perpendicular intersecting axes of reference are shown at $a$, $b$ and $c$, it being understood that axis $a$ is parallel to the surface of strip 5 and to the transverse to rolling direction and perpendicular to the rolling direction. Axis $b$ is parallel to the surface of strip 5 and to the rolling direction and axis $c$ is perpendicular to the surface of strip 5. Axes $a$, $b$ and $c$ intersect at point $o$. This orientation is referred to in the art as "cube texture" and is the orientation most invariably found in cold rolled and annealed strip or sheet metal made from face-centered cubic alloys of this type. This orientation is described by crystallographers and others skilled in the art as (100) [010] in the nomenclature of the accepted Miller Index System.

After the recrystallization anneal, the specimen strip was annealed for four hours at 1100° C., followed by a magnetic anneal for one hour at 650° C. in a magnetic field of about ten oersteds, as stated previously. This material was again examined by X-ray diffraction and it was found that it was now almost exclusively oriented such that the face-centered cubes had two of their opposite, parallel faces perpendicular to the rolling direction and two opposite, parallel faces, mutually prependicular to the other pair of faces, inclined at an angle of about 27° to the plane of the metal strip. This orientation is described by crystallographers and others skilled in the art as (102) [010] in the nomenclature of the accepted Miller Index System. It is illustrated in a schematic form in Fig. 4 in which the rectangular member 10 represents a portion of the metal strip in which the arrow bearing the legend R.D. indicates the rolling direction and the arrow bearing the legend T.D. indicates the transverse-to-rolling direction. These two directions are 90° from each other.

Figure 4:
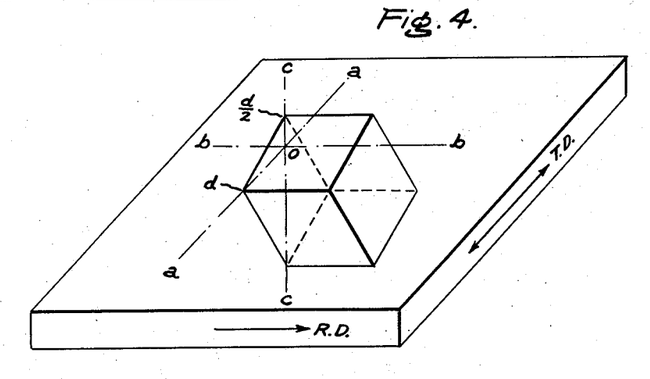

The three mutually perpendicular intersecting axes of reference are shown at $a$, $b$ and $c$, it being understood that axis $a$ is parallel to the surface of the metal strip 10 and to the transverse-to-rolling direction and perpendicular to the rolling direction. Axis $b$ is parallel to the surface of the metal strip 10 and to the rolling direction, and axis $c$ is perpendicular to the surface of the metal strip 10. Axes $a$, $b$ and $c$ intersect at point $o$. The unit cube illustrated in Fig. 4 has a cube face which intersects axis $a$ at a distance $d$ from the point of origin $o$, intersects axis $c$ at a distance $d/2$ from point $o$ and is parallel to axis $b$. A unit cube having a face so oriented with respect to the surface and rolling direction of such a metal strip is said to have the previously recited (102) [010] orientation. In Figs. 3 and 4 the atoms comprising the face-centered cube have been omitted for clarity.

The specimen strip was then re-annealed at 1200° C. for four hours followed by a magnetic anneal for one hour at 650° C. in a magnetic field of about ten oersteds, as set forth previously. The orientation resulting from this treatment was found to be substantially identical to that formed after the previous treatment, namely (102) [010]. The grain size of the material after this treatment was somewhat larger than before, as would be expected.

The specimen was then re-annealed at 1300° C. for four hours followed by a magnetic anneal for one hour at 650° C. in a magnetic field of about ten oersteds. The orientation resulting from this treatment was found to be similar to the (102) [010] orientations resulting from the two previously recited treatments, but much more poorly defined, indicating that fewer grains of the material possessed this desirable orientation. A comparison of the properties listed in Tables I, II and II reveals the corresponding deterioration of magnetic properties when this material is heat treated at a temperature of the order of 1300° C.

Specimen C as shown in Table II exhibited a measured 1,530,000 maximum permeability after a four hour 1200° C. pure dry hydrogen anneal and magnetic anneal. The direct current hysteresis loop of this specimen shown in Fig. 5 has a desirable rectangular configuration. It should be noted that this particular specimen does not exhibit the highest magnetic properties of the material of my invention disclosed herein, and is merely shown as an example of an embodiment of my invention.

As stated previously, it has been found that flat billet-type oriented castings, i.e. castings having a rectangular transverse cross-section and grain orientation similar to that illustrated in Fig. 1, are preferable to square cross-section cast ingots for two reasons. First, because the cast columnar grain structure characterized by an almost complete absence of equi-axed grains is more readily produced in this form, and second, because hot forging of the square ingots to flat billets for rolling adversely effects the crystal orientation of this material.

These facts were established in the following manner. Two slabs about 2½ inches thick by 4 inches wide and approximately 7 inches long were cast under substantially identical conditions in substantially identical split graphite molds from a heat weighing about 120 pounds melted in an induction furnace in an air atmosphere. The ingots were analyzed and found to consist of 63.4 percent nickel, 1.9 percent molybdenum, 0.16 percent manganese, a trace of silicon too small to be evaluated, about 0.02 percent aluminum, balance iron.

One ingot was sectioned transversely at a point midway of its longest dimension and found to have an almost completely columnar cast grain structure substantially identical to that illustrated in Fig. 1. The two halves of the ingot were reduced to 0.002 inch thick strip by rolling according to the following schedule. The ingot sections were heated to about 1150° C. and hot rolled from 2½ inches thickness to about 0.50 inch thickness, heated to about 1000° C. and hot rolled to 0.250 inch thickness. The 0.250 inch slabs were then annealed for one hour at about 1000° C. in a hydrogen atmosphere and rapidly cooled. The material was then cold rolled to about 0.100 inch thickness and annealed in hydrogen for five hours at about 700° C. and rapidly cooled. It was then cold rolled to 0.002 inch thickness, slit into one-half inch wide tape and recrystallized by annealing at about 900° C. for ten minutes. It was then annealed for four hours at about 1100° C., followed by a magnetic anneal at 650° C. under a hydrogen atmosphere and a unidirectional magnetic field of ten oersteds for one hour. Several cores made from this material were tested and exhibited permeabilities ranging from 900,000 to 1,250,000, remanence up to 12,040 gauss and coercivity as low as 0.0085.

The other 2½ by 4 by 7 inch ingot was hot forged at between 1100° C. and 1150° C. to form a billet measuring about 1 by 4 by 27 inches. A portion of this billet was heated to about 1150° C. and hot rolled to about 0.50 inch thickness, reheated to about 1000° C. and hot rolled to about 0.250 inch thickness. This material was cold rolled and annealed according to substantially the same schedule recited for the other ingot from this heat. Magnetic tests performed upon cores made from this material gave uniformly poor magnetic test results, e.g., 260,000 maximum permeability, 11,200 gauss remanence, and 0.039 oersted coercive force. In view of the origin and processing history of the specimens, it appears obvious that forging the ingots adversely affects their structure and resulting magnetic properties.

The ingot whose cross-section is shown in Fig. 2 was prepared by pouring a 120 pound air melted heat into a cast iron ingot mold. The ingot consisted of an alloy containing 64.5 percent nickel, 1.88 percent molybdenum, 0.30 percent manganese, 0.04 percent silicon, a spectrographic trace of aluminum, balance substantially all iron. The ingot was about 1 inches square in cross-section. The cross-section illustrated in Fig. 2 was taken from the lower half of the ingot and revealed columnar grains extending in about 1½ inches from the side walls and an equi-axed core. The ingot was hot forged at about 1150° C. to a billet approximately 1¼ by 4 inches in cross-section.

The billet was reduced by hot rolling at about 1000° C. from 1¼ inch to about 0.25 inch thickness.

The material was then annealed in hydrogen for one hour at 1000° C. and rapidly cooled. It was then cold rolled to about 0.100 inch thickness and annealed in hydrogen for five hours at 700° C. and rapidly cooled. It was then cold rolled to 0.002 inch thickness.

It was found that recrystallization of this material for ten minutes at 800° C., followed by an anneal for four hours at 1050° C. in hydrogen, and magnetically annealing at 650° C. for one hour in a unidirectional magnetic field of 10 oersteds resulted in poor magnetic properties. For example, its remanence was 11,200 gauss and its coercivity 0.90 oersted. When examined by X-ray diffraction it was found to have "cube" texture and the anneal at 1050° C. had not been effective to produce the desired (102) [010] orientation. Specimens of 0.002 inch thickness of this material were to anneals of four hours at 1100°, 1200° and 1300° C. followed by magnetic anneals. A specimen given successive 1200° and 1300° C. anneals followed by a magnetic anneal as previously recited had the best magnetic properties of this series, but was still inferior to material produced by rolling slab castings containing no equi-axed grains. This particular specimen had a maximum permeability of 712,500 at 10,200 gauss, a peak B of 12,510 gauss, a remanence of 11,810 gauss and a coercivity of 0.0126 oersted.

In order to more completely evaluate the magnetic material of my invention, particularly for saturable-core reactor applications, toroidal core specimens of 0.002 by ½ inch wide strip were prepared from "65 Permalloy" and "Deltamax" and a representative identically prepared specimen of the material of my invention. These toroidal cores contained 64 turns of the 0.002 inch strip and had a mean diameter of about 1.6 inches. The direct current hysteresis loops for these specimens were then obtained under identical test conditions using the conventional techniques and are reproduced in Figs. 5, 6 and 7 for the representative specimen of my invention, the "65 Permalloy" and the "Deltamax" specimens, respectively.

Figure 8:
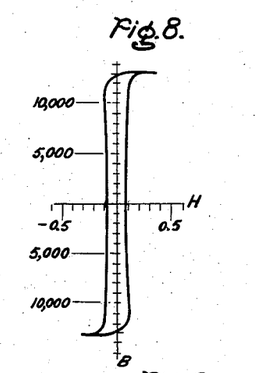
Figure 9:
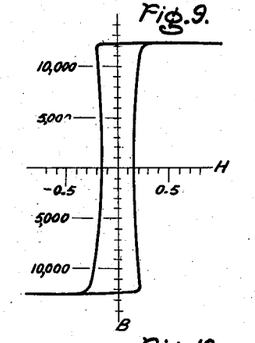
Figure 10:
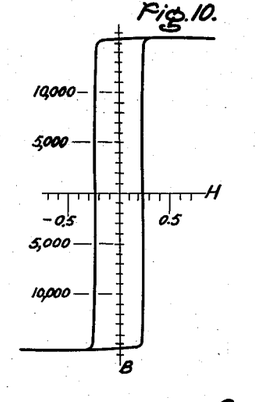
Figure 11:
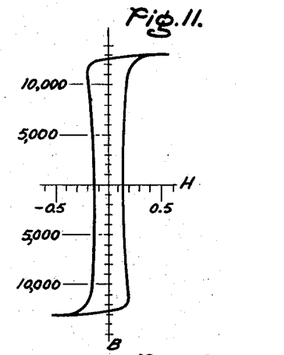
Figure 12:
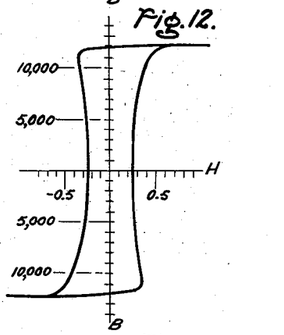
Figure 13:
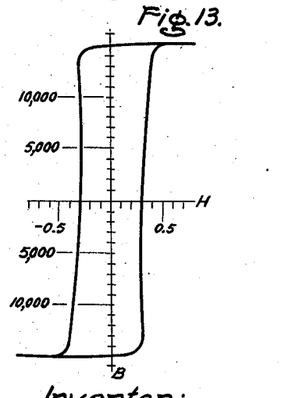

The dynamic hysteresis loops for these specimen materials was then determined for 60 cycle operation under identical test conditions. In Figs. 8, 9 and 10 are shown reproductions of the Lissajous figures obtained for the representative specimen of my invention, the "65 Permalloy" specimen and the "Deltamax" specimen, respectively. Similarly, in Figs. 11, 12 and 13 are shown reproductions of the Lissajous figures illustrating the dynamic hysteresis loops at 400 cycles under identical test conditions for the representative specimen of my invention, the "65 Permalloy" specimen and the "Deltamax" speciment, respectively.

The measuring equipment and techniques used to determine these dynamic hysteresis loops are well known and inasmuch as a complete discussion thereof is presented in an article entitled "Dynamic Hysteresis Loop Measuring Equipment" by H. W. Lord in the June 1952, issue of the journal "Electrical Engineering," on pages 518–521, no further discussion here is deemed necessary.

Figure 5:
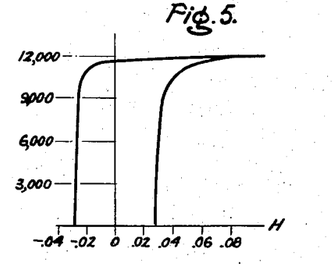
Figs. 5 to 13 are direct and alternating current hysteresis loops of specimens of my invention and prior art materials.
Figure 6:
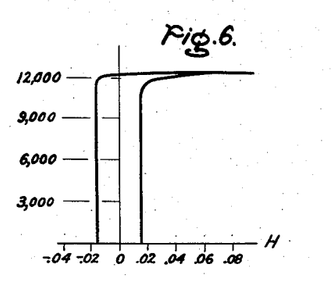
Figure 7:
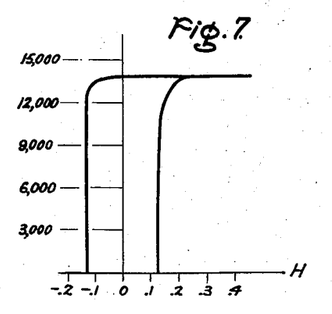

When the D.C. hysteresis loops shown in Figs. 5, 6 and 7 for the three specimen cores are compared, it will be apparent that the direct current coercive force of the "65 Permalloy" specimen core is smaller than that of the representative specimen core of the material of my invention and very much smaller than that of the "Deltamax" core, and from a rectangularity standpoint the "65 Permalloy" specimen core shows a configuration more desirable than that of either the "Deltamax" specimen core or the specimen core of the material of my invention. Further, with reference to the direct current hysteresis properties of the specimen cores it will be noted that the "Deltamax" specimen shows a somewhat higher residual inductance or remanence than do the other specimens.

In the following table are listed the accepted direct current magnetic properties of previously known rolled soft magnetic strip or sheet materials and the corresponding properties which have been attained with the material of my invention.

Table IV

| Material | $\mu_{Max}$ | $H_c$ | $B_r$ | Peak B ($B_s$) |
| --- | --- | --- | --- | --- |
| 65 Permalloy | 400,000 | 0.02 | 11,100 | 13,650 |
| Deltamax | 125,000 | 0.08 | 14,700 | 15,500 |
| Supermalloy | up to 1,000,000 | 0.035 | 4,200 | 7,900 |
| Material of my invention | 1,780,000 | 0.0053 | 11,950 | 12,500 |

In the foregoing table, maximum permeability is designated by the symbol $\mu_{max}$, coercive force by the symbol $H_c$, residual inductance or remanence by the symbol $B_r$ and saturation flux density by the symbol $B_s$, all of which symbols are widely accepted and well known in the art. The values given above for the direct current hysteresis characteristics of the previously known materials are in general maximum values, by which is meant the maximum permeability, the minimum coercive force, the maximum remanence and saturation flux density which have been reported. It is to be understood, of course, that individual samples of all of these materials may vary somewhat from sample to sample.

I discovered that a small amount of oxygen, at least 0.01 percent and preferably between 0.01 and 0.5 percent, should be present in the as-cast material of my invention in order that the finished strip or sheet have optimum magnetic properties. Castings made from metal which had been melted in a vacuum furnace and poured under a vacuum to reduce the oxygen content in the cast state below 0.01 percent invariably produced strip or sheet metal having poorer magnetic properties than material rolled from oxygen containing castings.

As will be readily appreciated by those skilled in the art, the oxygen is present in these castings in the form of oxide inclusions. As the material is reduced in thickness and subjected to the several hydrogen atmosphere annealing treatments, and particularly the final anneal, much, if not all of the oxide inclusions are reduced. It is believed that the oxide inclusions exert considerable influence upon the ultimate magnetic properties of the strip or sheet, and from the available evidence, the fineness and evenness of distribution of these inclusions is of primary importance.

Two ingots each having a rectangular lateral cross-section of about 1½ by 4 inches were cast from the same air furnace melt into graphite molds. Upon examination, both were found to have columnar grain structures substantially identical to that shown in Fig. 1 and the ingot first cast, which for convenience shall be referred to as ingot X, was composed of 65.1 percent nickel, 2.0 percent molybdenum, 0.21 percent manganese, less than 0.01 percent silicon, 0.0372 percent oxygen, balance iron. The second ingot, which shall be referred to as ingot Y, was poured from the same melt a few minutes after ingot X and had the same composition as ingot X except that it contained 0.0432 percent oxygen.

Both ingots X and Y were hot rolled to 0.25 inch thickness as previously described, annealed for one hour at 1000° C. and rapidly cooled in hydrogen. Both specimens were cold rolled to about 0.100 inch thickness, annealed for about five hours at about 700° C. and rapidly cooled in hydrogen. Both specimens were cold rolled to 0.002 inch thickness strip and recrystallized thirty minutes at 900° C. in hydrogen. Both were then annealed for four hours at 110° C. in hydrogen and then magnetically annealed as set forth previously.

Figure 21:
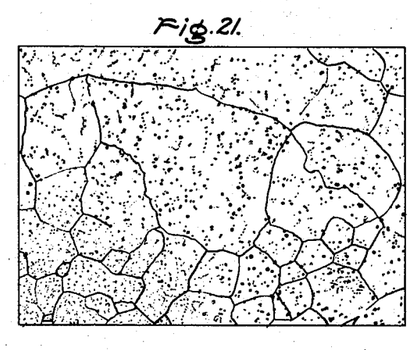
Figs. 21 to 26 are photomicrographs of the microstructure of the material of my invention.
Figure 22:
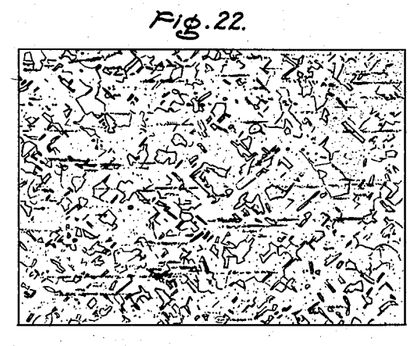
Figure 23:
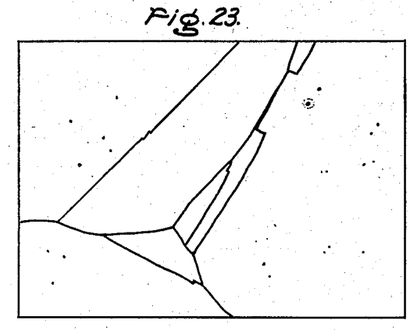

Photomicrographs at 250 diameters were made of the microstructures of the material from ingots X and Y and are reproduced in Figs. 21 to 26. Figures 21 to 23 are photomicrographs of specimens taken from ingot Y as cast, as 0.002 inch strip after the 30 minutes, 900° C. anneal and as the 0.002 inch strip after the 4 hour, 1100° C. anneal, respectively.

Figure 24:
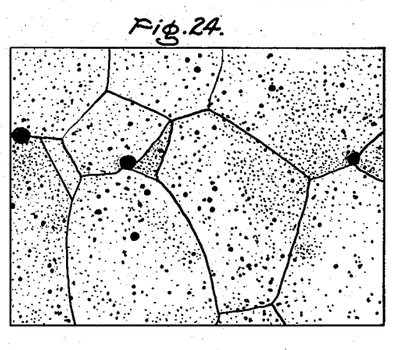
Figure 25:
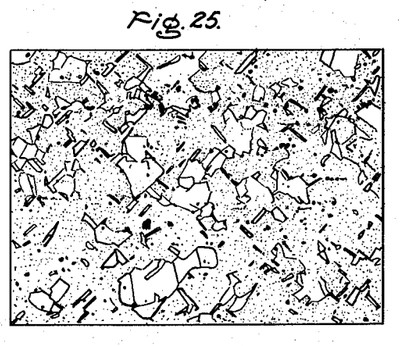
Figure 26:
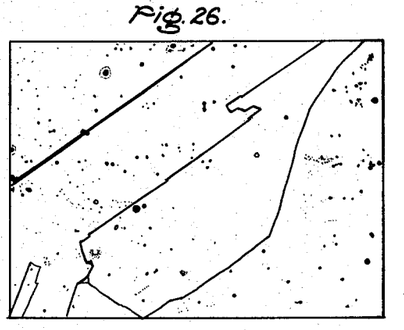

Figs. 24 to 26 are photomicrographs of specimens taken from ingot X as cast, as 0.002 inch strip after the 30 minute, 900° C. anneal and as the 0.002 inch strip after the four hour, 1100° C. anneal, respectively.

Upon comparing the as-cast microstructure of ingots Y and X in Figs. 21 and 24, respectively, it will be seen that the oxide inclusions and sites of former oxide inclusions, shown as the small dark spots, are finer and more evenly distributed in ingot Y than in ingot X. Similarly, in Figs. 22 and 25, the oxide particles are more evenly distributed in the strip from ingot Y, compared to similar strip from ingot X. Finally, in the finished material from ingots Y and X, shown in Figs. 23 and 26, it will be seen that the oxides have been substantially removed from the material from ingot Y, while considerable inclusions remain in the material from ingot X.

Material from the specimen shown in Fig. 23 was re-annealed for four hours at 1200° C. in hydrogen and magnetically annealed as described previously. The direct current magnetic properties of several specimens of this material were measured and found to have maximum permeabilities of from about 1,600,000 to 1,780,000, coercivities from about 0.0065 to 0.0053 oersteds, and remanence of from 12,000 to 11,950 gauss.

Material from the specimen shown in Fig. 26 was measured and found to have a coercivity of about 0.06 oersted and remanence of 11,000 gauss. Specimens of this material were re-annealed for four hours at 1200° C. in hydrogen, re-annealed four hours at 1300° C. in hydrogen and magnetically annealed. The direct current magnetic properties were measured and found to have improved, i.e. a maximum permeability of 980,000, remanence of 11,700 gauss and coercivity of 0.009 oersted. From a comparison of the foregoing data, it may readily be seen that an as-cast microstructure having finely divided evenly distributed oxide inclusions as shown in Fig. 21 is much more desirable in this material than that shown in Fig. 24.

When the dynamic hysteresis loops of the several core specimens illustrated in Figs. 8 through 13 are compared, the superiority of the material of my invention becomes more apparent. It will be noted, for example, upon comparing the dynamic hysteresis loops taken at 60 cycles and at 400 cycles for the "65 Permalloy" specimen illustrated in Figs. 9 and 12 and the 60 cycle and 400 cycle hysteresis loops for the "Deltamax" specimen illustrated in Figs. 10 and 13 that a substantial increase in loop width occurs as the frequency is increased, whereas in the material of my invention, there is considerably less widening of the loop as the frequency is correspondingly increased, as illustrated in Figs. 8 and 11. It will be noted from Figs. 5, 8 and 11 that the direct current coercivity for the specimen of the material of my invention there-illustrated is about 0.028 oersted and increases to 0.075 at 60 cycles and to 0.15 at 400 cycles. The specimen of "65 Permalloy," as shown in Figs. 6, 9 and 12, has a direct current coercivity of about 0.017 oersted which increases to 0.15 at 60 cycles and to 0.25 at 400 cycles. The specimen of "Deltamax," as shown in Figs. 7, 10 and 13 has a direct current coercivity of about 0.13 oersted which increases to about 0.25 at 60 cycles and to 0.30 at 400 cycles. It is to be further noted that the rectangularity of the hysteresis loop at 400 cycles shown in Fig. 10 for the material of my invention is not materially altered from the configuration of the 60 cycle dynamic hysteresis loop.

It has not been deemed necessary to reproduce the direct and alternating current hysteresis loops for "Supermalloy" inasmuch as the remanence or residual inductance of this material and the non-rectangular configuration of both its direct current and dynamic hysteresis loops are such as to render it unsuitable for use in saturable core reactor apparatus for which the present invention is particularly suited.

While the soft magnetic material of my invention is generally applicable to and finds wide utility in many types of saturable core reactor apparatus, it is particularly advantageously employed as the core material in magnetic amplifiers. A typical magnetic amplifier circuit is schematically illustrated in Fig. 14.

Figure 14:
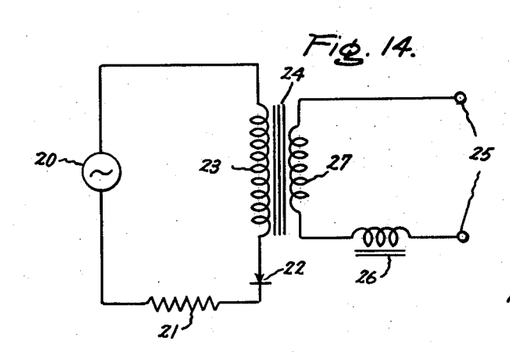
Fig. 14 is a schematic diagram of a magnetic amplifier circuit.

As will be recognized by those skilled in the art, the circuit shown in Fig. 14 is a schematic representation of a half-wave magnetic amplifier and comprises a source of alternating current 20, a load 21 shown as a resistance, a rectifier 22, a coil known in the art as the "load" coil or "gate winding" 23, a saturable soft magnetic core 24, a source of direct current 25, a choke coil or inductance 26 and a control coil or winding 27.

The load 21 is supplied with half cycle pulses or fractions thereof passed through rectifier 22. Direct current from source 25 flows through winding 27 in such a direction that the total magnetic field in the saturable core 24 tends to reduce the amount of current by altering the fraction of the half cycle pulse passed by the rectifier 22 to load 21. As the amount of direct current flowing through coil 27 is increased, the amount of current supplied to load 21 is correspondingly reduced.

Figure 15:
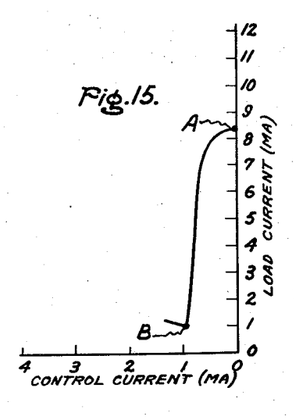
Figs. 15 to 20 are control characteristic curves for magnetic amplifier circuits using the material of my invention and prior art materials for saturable cores.

The control characteristics of a half-wave self-saturated high impedance control circuit, magnetic amplifiers employing some previously known rectangular loop characteristic core materials may tend to exhibit a discontinuity or instability. Ideally, a control characteristic of such an amplifier may be represented as a curve as shown in Fig. 15, for example. When the control current is zero, the amplifier is practically full "on" as indicated by point A. As the control current is increased, the control point moves down the curve to the "cut-off" point B. The "cut-off point" may be defined in terms of the circuit shown in Fig. 14 as the condition prevailing when minimum current is passed through winding 23 to load 21. Additional control current beyond the cut-off point will cause a slow increase of the output current. When the control current is reduced the control point should retrace the characteristic curve through the point B back to point A.

Figure 20:
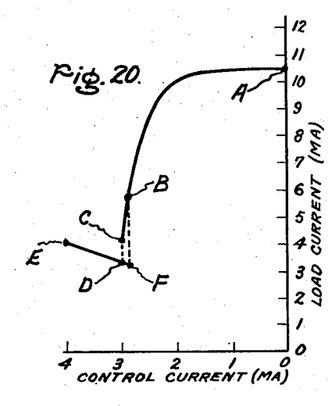

When a material such as "Deltamax" is utilized as the core material, however, the characteristic curve of the amplifier exhibits an instability best illustrated by Fig. 20. At zero control current, the magnetic amplifier is practically full "on" as indicated by point A in Fig. 20. As the control current is increased the control point moves down the curve to point C where a control curve becomes discontinuous and the magnetic amplifier jumps to "cut-off" at point D. As the control current is further increased, the load current increases slowly with the control point moving toward point E. When the control current is reduced from the region beyond "cut-off" the control point retraces the curve between E and D but continues in a cut-off attitude until the control current has been reduced to point F. At this point there is a very distinct discontinuity in the control characteristic with the magnetic amplifier control point jumping from cut-off at point F to the point B. In extreme cases, this jump may be 50 percent of the control range between "on" and "cut-off." Further decrease in the control current to zero will cause the control point to retrace the curve from point B to point A.

Figure 16:
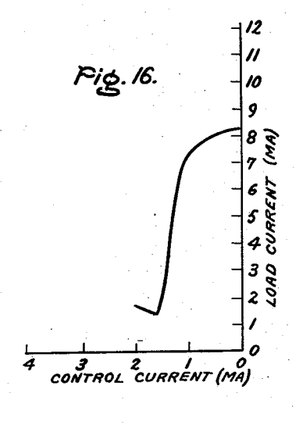

In Figs. 15 and 16 are shown the control characteristics of a magnetic amplifier circuit utilizing the same toroidal core specimen of the material of my invention whose magnetic properties are illustrated in Figs. 5, 8 and 11. Figs. 15 and 16 illustrate the control characteristic for 60 cycles and a total load resistance of 706 ohms, and for 400 cycles and a total load resistance of 5206 ohms, respectively.

Figure 17:
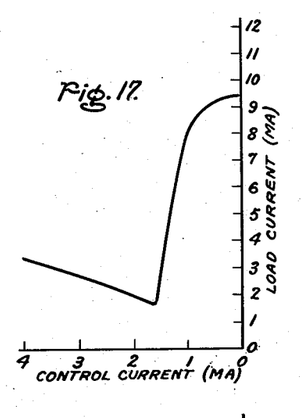
Figure 18:
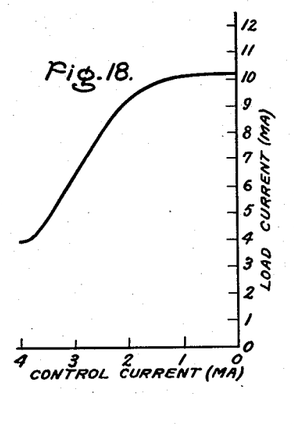

In Figs. 17 and 18 are illustrated the control characteristics of a magnetic amplifier employing the "65 Permalloy" core specimen whose magnetic characteristics are illustrated in Figs. 6, 9 and 12. Figs. 17 and 18 illustrate the control characteristic for 60 cycles and a total load resistance of the amplifier of 706 ohms, and 400 cycles and a total load resistance of the amplifier of 5,206 ohms, respectively.

Figure 19:
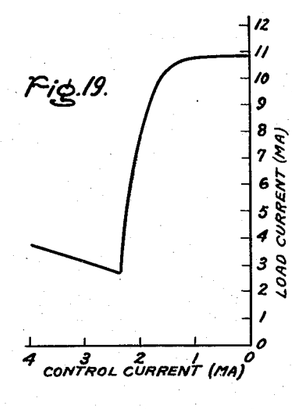

In Figs. 19 and 20 are illustrated the control characteristics for an identical magnetic amplifier utilizing a toroidal core of "Deltamax" for which the magnetic characteristics are shown in Figs. 7, 10 and 13. Figs. 19 and 20 illustrate the control characteristic for 60 cycles and a total load resistance of 706 ohms, and 400 cycles with a total load resistance of 5,206 ohms, respectively.

While the control characteristic curves of the "65 Permalloy" core shown in Figs. 17 and 18 exhibit no discontinuity, it should be noted that this is only true when changes in control current are limited to a slow rate. The rate of change of control current must be held below 0.01 milliampere per second when going from cut-off to points before cut-off to prevent discontinuity of the control characteristic. The control characteristic curve of the "65 Permalloy" core at 400 cycles exhibits an undesirable configuration. It will be noted that the control current must be varied by as much as four milliamperes in order to obtain full control.

The control characteristic curves for the "Deltamax" core are shown in Figs. 19 and 20. This material exhibits control instability or discontinuity for 400 cycles regardless of the rate of change of control.

Upon examination of Figs. 15 and 16 and comparing the control characteristics of the core embodying the material of my invention with the corresponding control characteristic curves for "65 Permalloy" and "Deltamax" it is to be noted that the slopes of the curves of the material of my invention are much steeper and the variation of control current in milliamperes for the control of load current is much smaller. It is to be noted in particular that the minimum control current value for the core of my invention is about one-half that of the "Deltamax" core. The increased steepness of the control curve is such as to provide approximately a sevenfold increase in power gain at 60 cycles and a fivefold increase at 400 cycles.

From the foregoing it is apparent that I have provided a soft magnetic material having superior magnetic properties than previously known materials and which is particularly suited for use as a core material for saturable core reactor apparatus. As has been shown in the foregoing description, these superior properties are attained, at least in part, by the particular processing steps disclosed. It will be recognized by those skilled in the art that minor variations in composition and processing techniques may be employed without materially affecting or departing from the scope of my invention. It should therefore be understood that the specific embodiments disclosed heretofore are by way of example and that the scope of my invention should be limited in on way except as defined in the appended claims.

What I claim as new and desire to secure by Letters Patent of the United States is:

1. A method of forming a grain oriented cast ingot for subsequent rolling, comprising melting an alloy consisting essentially of from 55 to 70 percent nickel, 1 to 3 percent molybdenum, balance substantially all iron, pouring the molten metal into an ingot mold having substantially planar spaced surfaces of greater width than the perpendicular distance between the spaced surfaces to form an ingot of generally rectangular cross-sectional shape, and extracting the heat from the molten metal through the planar surfaces in a direction substantially perpendicular thereto to provide for solidification of the metal substantially entirely as elongated columnar grains having longitudinal axes perpendicular to the planar surfaces.

2. The method recited in claim 1 in which that part of the mold contacted by the metal consists essentially of graphite.

3. A method for preparing oriented face-centered cubic sheet metal comprising the steps of providing a casting having at least two substantially parallel spaced planar faces of greater width than the perpendicular distance therebetween and consisting essentially of from about 55 to 70 percent nickel, 1 to 3 percent molybdenum, balance substantially all iron, comprising a plurality of elongated columnar grains extending between the planar faces and having their longitudinal axes substantially perpendicular to the planar faces, reducing the casting into sheet metal in a plurality of rolling passes, the direction of rolling being maintained substantially perpendicular to the longitudinal axes of the columnar grains, heat treating the material and subjecting the reuslting recrystallized sheet metal to a unidirectional magnetic anneal.

4. The method recited in claim 3 in which the casting is reduced in thickness by heating to at least 1000° C. and hot rolled to a predetermined thickness, annealed for at least one hour in a hydrogen atmosphere at a temperature of at least 900° C. and rapidly cooled, cold rolled from 55 to 70 percent, annealed for at least 4½ hours in a hydrogen atmosphere at a temperature of at least 650° C. and rapidly cooled, cold rolled from 95 to 99 percent to the final, desired thickness, recrystallized by annealing for at least 10 minutes in a hydrogen atmosphere at from 500° C. to 1100° C., annealed for at least 2 hours in a hydrogen atmosphere at from 1050° C. to 1250° C. and magnetically annealed by cooling in a hydrogen atmosphere from about 550° to 675° C. to about 300° C. in a magnetic field of 8 to 12 oersteds.

5. A polycrystalline soft magnetic material comprising a substantially planar metal sheet elongated in one direction by rolling and consisting essentially of 55 to 70 percent nickel, 1 to 3 percent molybdenum, balance substantially all iron, the grains comprising the metal sheet having the face-centered cubic lattic form and substantially all the grains having a crystal structure orientation of (102) [010] in the rolling direction.

6. A polycrystalline soft magnetic material as recited in clam 5 consisting essentially of 58 to 68 percent nickel, 1.75 to 2.25 percent molybdenum, 0.2 to 0.4 percent manganese, balance substantially all iron.

7. A polycrystalline soft magnetic material as recited in claim 5 consisting essentially of from 63 to 67 percent nickel, 1.75 to 2.25 percent molybdenum, less than 0.35 manganese, up to 0.09 silicon, up to 0.05 aluminum, balance iron, having a maximum permeability of at least 1,000,000, a direct current remanence of at least 11,500 gauss and a direct current coercivity of less than 0.02 oersted.

8. A method of forming a grain-oriented cast ingot for subsequent rolling, comprising melting an alloy consisting essentially of from 55 to 70% nickel, 1 to 3% molybdenum, between 0.01 and 0.05% oxygen, balance essentially all iron, pouring the molten metal into an ingot mold having substantially planar spaced surfaces of greater width than the perpendicular distance therebetween to form an ingot of generally rectangular cross-sectional shape, and extracting the heat from the molten metal through the planar surfaces in a direction substantially perpendicular thereto to provide for solidification of the metal substantially entirely as elongated columnar grains having longitudinal axes perpendicular to the planar surfaces.

References Cited in the file of this patent

UNITED STATES PATENTS

| | | |
|---|---|---|
| 1,634,999 | Krause | July 5, 1927 |
| 2,323,944 | Snoek | July 13, 1943 |
| 2,558,104 | Scharschu | June 26, 1951 |
| 2,569,468 | Gaugler | Oct. 2, 1951 |
| 2,578,407 | Ebeling | Dec. 11, 1951 |

OTHER REFERENCES

"Ferromagnetism" (Bozorth), published by Van Nostrand Co. (New York), 1951 (page 136 relied on).